United States Patent [19]

Zbinden

[11] 4,285,063

[45] Aug. 18, 1981

[54] APPARATUS FOR PROVIDING EVENLY DELAYED DIGITAL SIGNALS

[75] Inventor: Terry B. Zbinden, Maple Grove, Minn.

[73] Assignee: Sperry Corporation, New York, N.Y.

[21] Appl. No.: 47,518

[22] Filed: Jun. 8, 1979

[51] Int. Cl.³ .......................... H04N 5/04; H04L 7/00
[52] U.S. Cl. ..................................... 375/106; 358/149
[58] Field of Search .......................... 358/149; 333/18; 375/36, 38, 107, 106

[56] References Cited

U.S. PATENT DOCUMENTS

| | | | |
|---|---|---|---|
| 3,368,034 | 2/1968 | Dischert et al. | 358/149 |
| 3,368,035 | 2/1968 | Dennison | 358/149 |
| 3,384,707 | 5/1968 | Bopp et al. | 358/149 |

Primary Examiner—Thomas A. Robinson
Attorney, Agent, or Firm—Kenneth T. Grace; William E. Cleaver; Marshall M. Truex

[57] ABSTRACT

Apparatus for distributing evenly delayed digital signals to a plurality of separate physical locations in which each location utilizes one particular digital signal. At each physical location an apparatus for adjusting the timing delay of the digital signal is provided so that all physical locations may utilize the digital signals, as for example, a pulse from a timing chain, at the same instant of time with respect to each other. The apparatus for adjusting the timing delay at each location includes a receiver for accepting the digital signal. After the receiver, the digital signal is routed to both a delay line capable of providing a plurality of time delays and to a selector having an input for the received digital signal and for each one of the time delays provided by the delay line. Finally, each selector provides a means of selecting just one of the signals to be utilized at that physical location. The selection process can then be adjusted manually to assure an evenly delayed digital signal throughout all physical locations.

4 Claims, 9 Drawing Figures

CARD A

CARDS B & C

CARDS B & C

APPARATUS FOR PROVIDING EVENLY DELAYED DIGITAL SIGNALS

BACKGROUND OF THE INVENTION

The present invention relates generally to digital logical circuits and particularly to a digital system in which the propagation time delay of a digital signal or signals is critical with respect to separate logical elements within that digital system.

Digital systems, in particular digital computer systems, frequently need critically timed signals throughout the digital system. In digital systems in which the physical size of the system is small and which has relatively slow timing with respect to the speed of the circuits, the timing of signals being distributed through the digital system is not particularly critical. But as physical dimensions of the digital system become larger as, for example, the capacity of the digital system increases, the delay of certain timing systems signals becomes more critical as the propagation delay due to increased physical dimensions becomes greater and greater. Further, the margin for error in delay of timing signals decreases as the overall timing of the digital system becomes faster and faster with respect to the speed of the circuits involved. The physical delay in the signal routing of a digital signal throughout a digital system then may become a very significant factor. It may be intolerable, for example, to allow a given digital signal to reach a certain portion of the logic of the digital system substantially before that same digital signal reaches another portion of the logic located in a separate physical location from the other circuitry.

In many such digital systems in which the digital signals are critical, either the digital signals are adjusted manually or allowances are made in the logical design to enable the circuitry to tolerate the inherent propagation delays that these signals encounter. But many computer systems and other digital systems are constructed in a modular fashion in which certain logical circuits or elements may be removed from the system and the system may be constructed or reconstructed in a different modular fashion than before. This modular design tends to increase the physical separation between different logical elements within that digital system. Further, many digital systems have the option for a variety of circuitry functions which provide an additional variety of variance in signal routing and in circuit loading and in the use to which certain digital signals may be put. All these factors tend to increase the significance of propagation delays for certain digital signals within those systems.

Further, in critical digital systems, the delay of each signal is dependent upon the electrical loading, the number of circuits a particular circuit must drive, or is dependent upon the particular wire utilized or other transmission medium which is utilized and is dependent upon the exact routing of the transmission medium. Changes in any of these variables would necessarily change the propagation delay of a digital signal through that medium by changing such characteristics of the medium as the characteristic impedance of the medium or through inductive coupling into the medium as well as the time required to traverse a particular distance with an electronic signal. These differences may be different in different models of the same digital system or even in different units of the same system. Thus the delay to which a given digital signal may be delayed cannot accurately be predicted. Thus, unless some adjustment is made, an allowance must be designed into the digital circuitry to allow for variances in propagation delays. These allowances would necessarily decrease the overall speed of the digital speed of the digital system and hence are undesirable.

With the modular arrangement of digital systems, the predictability of propagation delays and the adjustment which must be made to compensate for these delays becomes very, very difficult.

SUMMARY OF THE INVENTION

Accordingly, the present invention provides an easy means of providing a uniform time delay for a given digital signal at each physical location (or printed circuit assembly or modular assembly for example) where that digital signal is utilized by other logical circuitry within the digital system. This adjustment after the particular digital system is assembled and all the circuitry is in place allows an equal amount of skewing with respect to each other. For all physical locations or printed circuit assemblies containing logical circuitry the digital signal is evenly delayed and to each logical circuit it looks as if there were no delays in the system at all.

The present invention provides an apparatus for distributing evenly delayed digital signals to several physical locations in which each location utilizes one particular digital signal. The present invention is an apparatus for adjusting the timing delay of the digital signal provided so that all physical locations may utilize the digital signal as, for example, a pulse from a timing chain, at the same instant of time with respect to each other. The apparatus for adjusting the timing delay at each physical location or modular assembly consists of a receiver for accepting the digital signal. After the receiver, the digital signal is routed to both a delay line capable of providing a plurality of time delays and to a selector having an input for the received digital signal and for each one of the time delays provided by the delay line. Finally, each selector provides a means of selecting just one of the signals to be utilized at that physical location. The selection process can then be adjusted manually to ensure an evenly delayed digital signal.

BRIEF DESCRIPTION OF THE DRAWINGS

FIG. 1 illustrates a modular arrangement of a modern digital electronic computer or other electronic equipment;

FIG. 2a illustrates how several modular equipments may be connected and illustrates the physical location problems observed in transmitting digital signals among them;

FIG. 2b is a bottom view of the back panel wiring of the modular equipments illustrated in FIG. 2a;

DESCRIPTION OF THE PREFERRED EMBODIMENT

Figures 1, 2A, 2B:
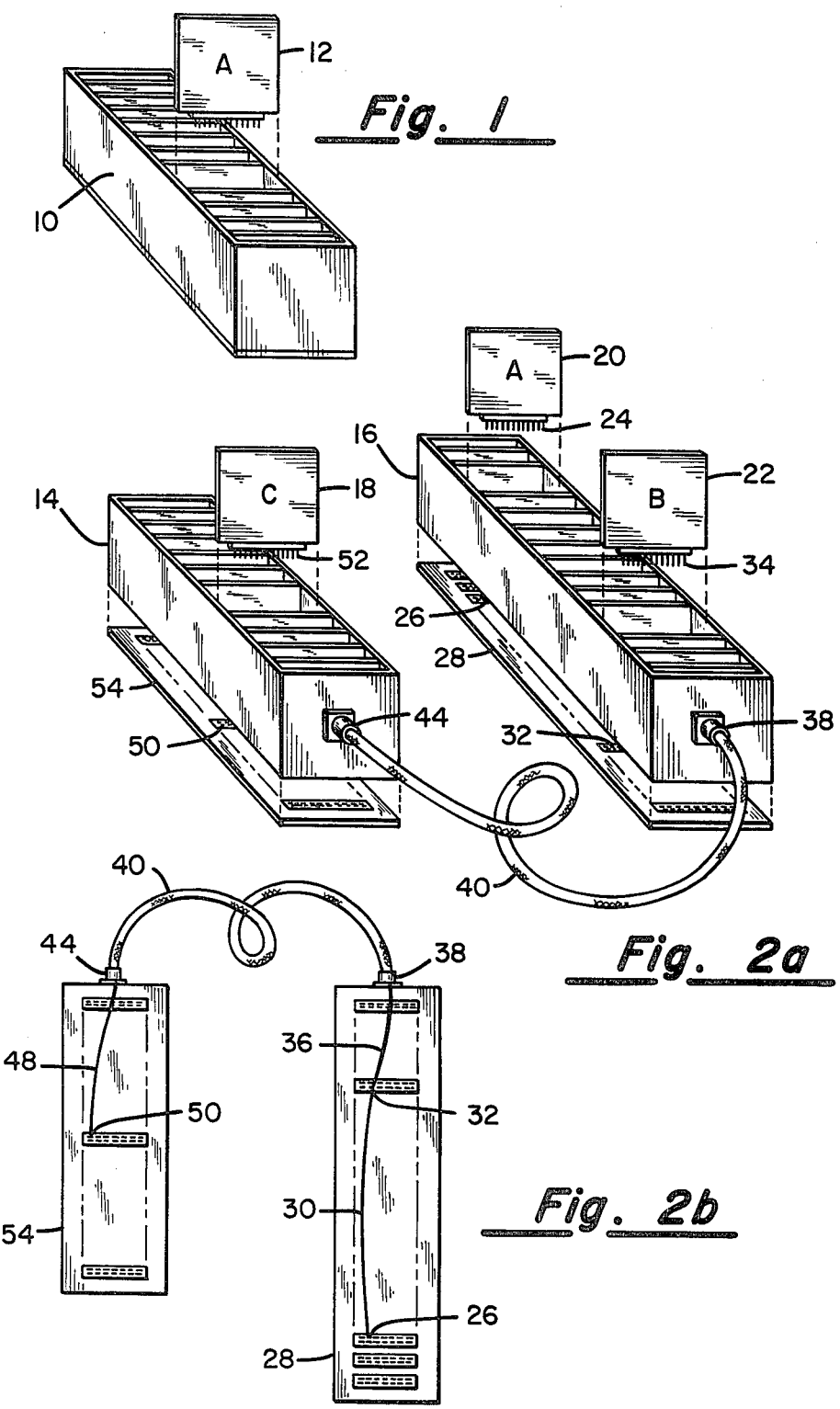

FIG. 1 illustrates the modularity to which many digital systems including digital electronic computers are constructed. Here a chassis 10 is seen comprised of a plurality of printed circuit assemblies. For purposes of illustration, one printed circuit assembly 12 is shown in exploded view as it would be pulled from the chassis 10 if it were to be removed from the chassis 10 for repair, replacement, or other operation. Note that each of the printed circuit assemblies, like printed circuit assembly 12, are all plug removable from the chassis 10. This illustrates the modular construction of a digital system today.

FIG. 2a illustrates a plurality of printed circuit assemblies and illustrates how electronic connections must be made physically between logical circuits on one printed circuit assembly to logical circuits on another printed circuit assembly. Here two chassis are illustrated, chassis 14 and chassis 16. Chassis 14 is shown as containing a plurality of printed circuit assemblies including printed circuit assembly 18, labeled in the figure with the letter C. Chassis 14, of course, contains many other printed circuit assemblies, but for purposes of illustration and distributing a digital signal only printed circuit assembly 18, shown in exploded view, will be discussed. Also shown is a chassis 16 which contains printed circuit assemblies 20 and 22, labeled with the letters A and B respectively. Again chassis 16 contains many other printed circuit assemblies, but again for purposes of illustrating the distribution of the digital signal only printed circuit assemblies 20 and 22 will be discussed.

Assume for the moment that a digital signal originating on a printed circuit assembly 20 is to be transmitted or distributed to logic circuitry located on printed circuit assembly 22 and printed circuit assembly 18. In order to perform this electrical connection, the following physical steps or paths must be followed. First, the digital signal must pass from its origination on printed circuit assembly 20 down to plug pin 24. When the printed circuit assembly 20 is installed within chassis 16, the plug pin 24 is mated with a corresponding socket 26 located on a back panel 28 which is attached as part of chassis 16. Back panel 28 is shown in exploded view also for ease of understanding the FIG. 2a. Reference to FIG. 2b better illustrates the electrical connections made within the back panel 28. Here a bottom view of back panel 28 also shows socket 26. A signal wire 30 transmits the digital signal along back panel 28 to another socket 32. Socket 32, also shown in FIG. 2a, will then transmit the signal through pin 34 and onto printed circuit assembly 22 where it may be utilized by the logical circuitry contained thereon. In addition to being routed to printed circuit assembly 22, as mentioned before, it is necessary to route the signal to printed circuit assembly 18. This is shown accomplished first by reference to FIG. 2b by another wire 36 connected to socket 32 and to connector 38, referenced in both FIG. 2b and FIG. 2a. The digital signal then passes from connector 38 through cable 40 to connector 44. A wire 48, illustrated in FIG. 2b, then transmits the digital signal along back panel 54 to another socket 50. By reference to FIG. 2a, pin 52 on printed circuit assembly 18 plugs into socket 50 when printed circuit assembly 18 is installed within chassis 14. The signal then passes from pin 52 onto the printed circuit assembly 18 where it may be utilized by the logic.

It can be seen from the above description of the physical path that the digital signal must traverse what may be a very simple functional path but that may turn out to be a very complex mechanical path due to the modular construction of the equipment and to the separate physical locations of the logical circuits utilizing the digital signal. Note also that the different logical circuits utilizing the digital signal obtain the signal from widely varying physical routing paths. Here the circuitry located on printed circuit assembly 22 is closer physically to the origin of the signal on printed circuit assembly 20 than is the logic circuitry located on printed circuit assembly 18. In actual practice this would probably mean that the propagation delay from printed circuit assembly 20 to printed circuit assembly 22 would be shorter than the propagation delay from printed circuit assembly 20 to printed circuit assembly 18. However, these exact delays may be influenced by many other factors, for example, the number of other printed circuit assemblies installed in chassis 16 and 14, the length of cable 40 or indeed the actual physical construction of cable 40 and the actual physical routing of the wires 30, 36, and 48 within the chassis 16 and 14, respectively. In short, it is very difficult, in a variable modular system, to predict accurately what propagation delays may exist between logical circuit elements located on separate printed circuit assemblies as they are installed in the chassis 14 and 16 and operating. Prior art digital systems have tried to minimize these effects by making the circuitry tolerant of variable delays and by providing adjustment of timing signals within a printed circuit assembly unit, that is, by adjusting the timing of the digital signal within the printed circuit assembly 20 itself.

It will be seen that the present invention provides an adjustment means whereby the propagation delay of the digital signal from printed circuit assembly 20 to printed circuit assembly 22 and printed circuit assembly 18 may be equalized thus resulting in no apparent delay between printed circuit assembly 22 and printed circuit assembly 18. This apparatus for adjustment provides a means for adjusting time delays within the printed circuit assemblies and the logic contained thereon when actually installed in the chassis 14 and 16 and operating.

Figure 3:
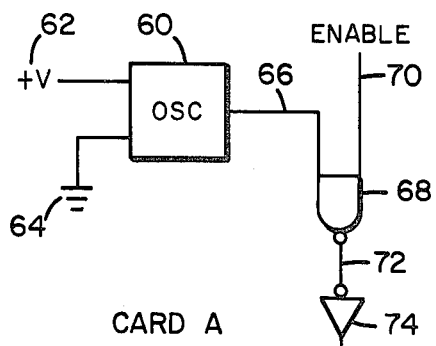
FIG. 3 illustrates the circuitry of the present invention where the digital signal being distributed originates.

FIG. 3 illustrates the origin of the digital timing signal that may be the subject of the critical delay concern that is the subject of this invention. Here in FIG. 3 an oscillator 60 connected to a positive voltage supply 62 and ground 64 is merely providing a series of regularly occurring digital pulses on line 66. This is merely an exemplary way of creating the digital signal which we will provide distribution for on an evenly delayed basis. The regularly occurring digital pulses on signal line 66 are connected to an input to NAND gate 68 of which the other input is connected to an enable 70. This merely illustrates that the origin of the digital signal may be started and stopped based upon the logical state of the enable 70, and again is merely an exemplary means for creating the digital signal. Thus, we start with signal line 72, the output line of NAND circuit 68, upon which output line is the digital signal 73 that we are actually attempting to distribute throughout the digital system on an evenly delayed basis. A driver 74 is connected to the signal line 72 and the output of the driver 74 is outputted from the printed circuit assembly at 76. The function of the driver 74 is to provide a circuit that will transmit the digital signal 73 throughout the long lines and many circuits to which the output of the printed circuit assembly 76 may be subjected. It provides no logical operation to the digital signal 73. The logic illustrated in FIG. 3 would be located on the printed circuit assembly originating the digital signal or as has been illustrated previously in FIG. 2, would be located on printed circuit assembly 20.

In prior art digital systems, each printed circuit assembly that makes use of the digital signal 73 would be connected to the signal's distribution at 78 and the signal would be sent through a receiver 80. After passing through the receiver 80, the signal would then be made available to the logic utilizing the signal on the printed circuit assembly at 82. The receiver 80 provides no logical operation on the signal but is merely a circuit that provides as uniform an impedance in loading characteristics as can be achieved and that is relatively tolerant to noise. The circuitry illustrated in FIG. 4 would be located in a prior art system on printed circuit assemblies 22 and 18.

Figure 4:
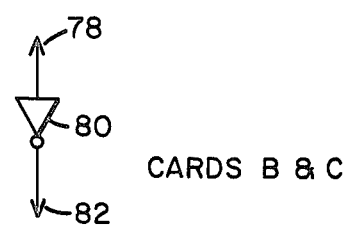
FIG. 4 illustrates the prior art circuitry where the digital signal is utilized.
Figure 5:
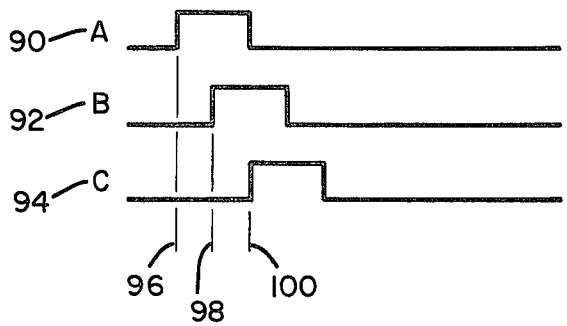
FIG. 5 illustrates the signal skewing as the result of using the prior art circuitry of FIG. 4.

Let us observe with respect to FIG. 5 how the signals utilizing the prior art circuitry of FIG. 4 might look if utilized on printed circuit assemblies 22 and 18 in FIG. 2a. FIG. 5 illustrates a graph of digital signals illustrating amplitude in the vertical dimension and time increasing to the right in the horizontal direction. Illustrated is signal 90 which represents the digital signal 73 at its origin 76 on printed circuit assembly 20 in FIG. 2a. As the digital signal 90 exits printed circuit assembly 20 in FIG. 2a, passes through pin 24, through socket 26, through wire 30, through socket 32, through pin 34, and finally onto printed circuit assembly 22, the waveform 92 results. Notice that waveform 92 while being similar to waveform 90 has significant time delay associated with it. Namely, that time between time 96 and time 98.

As the signal 90 needs to transfer from printed circuit assembly 20 in FIG. 2a to printed circuit assembly 18, it must pass through pin 24, through socket 26, through wire 30, through socket 32, through wire 36, through connector 38, through cable 40, through connector 44, through wire 48, through socket 50, and through pin 52 before it reaches printed circuit assembly 18. As a result of this long and arduous path, the signal resulting is the signal 94 in FIG. 5. Note that the signal 94 shows a much increased time delay, namely, that time between time 96 and time 100. Moreover, not only is the time between origin and one destination apparent, that is, for example, between time 96 and 98 in terms of printed circuit assembly 22 and between time 96 and time 100 with respect to printed circuit assembly 18, it is significant that there is a time delay between time 98 and time 100, between which the receiving printed circuit assemblies view the transmitted digital signal. That is, printed circuit assembly 22 will receive the signal at time 98 while printed circuit assembly 18 will receive the signal at time 100. This time delay between time 98 and time 100 can be critical to a given digital circuit.

Figure 6:
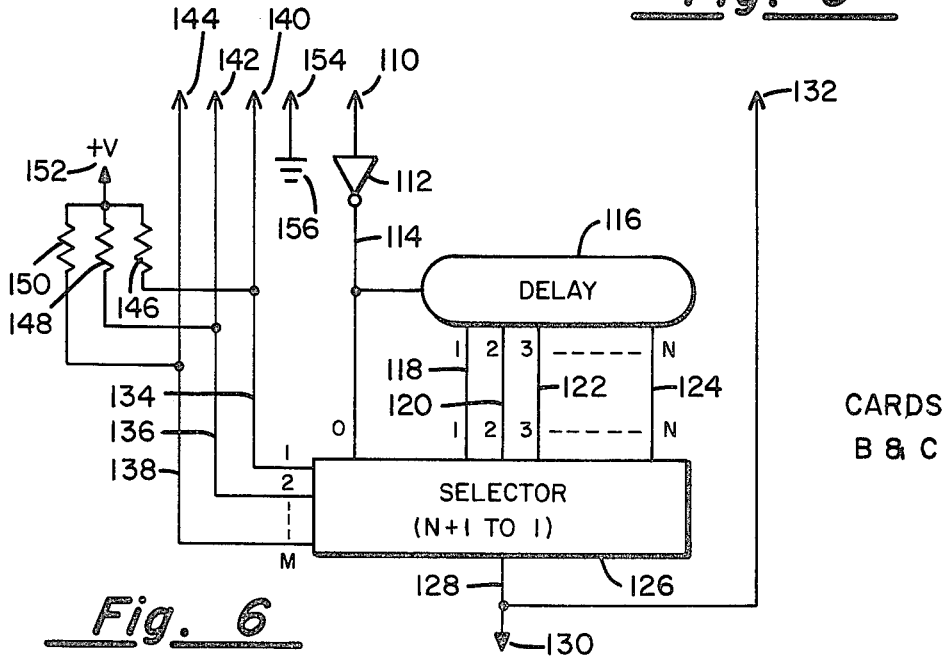
FIG. 6 illustrates the circuitry of the present invention where the digital signal is utilized.

FIG. 6 illustrates the part of the circuitry of the present invention that will provide an evenly delayed digital signal throughout the distribution network of that signal. Shown in FIG. 6 is the logic circuitry that would be included on all receiving printed circuit assemblies, that is, with reference to FIG. 2a, this circuitry of the present invention would be included on printed circuit assemblies 22 and 18. In FIG. 6, as in the prior art circuit, the signal is received from the distribution network at 110 and sent through receiver 112. Again, receiver 112 performs the same function as in the prior art circuit and the output 114 is made available for further processing. The signal 114 is sent to a multiple tapped time delay means 116. In operation this delay means may be simply a multi-tapped delay line having a plurality of different time delayed outputs, illustrated in FIG. 6 as 118, 120, 122, and 124. The actual number of outputs that need to be available from time delay means 116 is not critical as long as the particular range of time delay adjustment is obtained and the difference in time between individual outputs as, for example, between signal 118 and signal 120, is made a sufficiently small amount to satisfy system requirements. All of the signal outputs from the delay means 116, namely, 118, 120, 122, and 124, are sent as inputs to selector 126. Also as an input to this selector 126 is the original signal 114. Selector 126 then selects one of the inputs, namely, either 114, 118, 120, 122, or 124 to be coupled directly to output 128. The output 128 is then made immediately available on the printed circuit assembly for the logic circuitry utilizing the signal at 130. In addition, the output 128 of selector 126 is fed back and made available at the edge of the manually accessible printed circuit assembly at point 132.

The selector 126 contains M select lines where $2^M$ is greater than or equal to N. These M select lines provide the information to the selector 126 to decide which one of the inputs, 114, 118, 120, 122, and 124 to couple directly to output 128. These M select lines, namely, 134, 136, and 138 are fed back to the externally accessible access to the printed circuit assembly at 140, 142, and 144, respectively. In addition, each of the select lines 134, 136, 138 are fed through a pull-up resistor 146, 148, and 150, respectively, each of which is tied to a positive voltage source. Also available at the manually accessible printed circuit assembly edge is a point 154 which is connected directly to logical ground 156. In this state, if nothing else is done, the select lines 134, 136, 138 will all be in a logical high condition as a result of pull-up resistors 146, 148, 150 and the selector 126 will select the N input to the selector 126 or input 124. The circuitry illustrated on FIG. 6 would be made available on printed circuit assemblies 22 and 18 of FIG. 2a. With all of the printed circuit assemblies installed and the digital system operating, it is relatively easy then to manually observe the time delay of the resulting signal at accessible point 132 on each of printed circuit assemblies 22 and 18. The difference in propagation delay then may be observed. External jumpers may then be connected between the individual select lines 134, 136, and 138 at their accessible points 140, 142, and 144 and the accessible logical ground point 154. By selectively grounding one or more of points 140, 142, and 144 the logical state of select lines 134, 136, and 138 may be changed. In this way, the selector 126 may be made to select a different amount of delayed signal and provide a different amount of delay to point 128 and hence to the logic circuitry utilizing the digital signal. By adjusting the jumpers between points 140, 142, and 144 and logical ground point 154 while manually observing the logical delay between point 132 on printed circuit assemblies 22 and 18, the amount of time delay between the digital signal as seen by the logic circuitry utilizing the signal between printed circuit assemblies 22 and 18 can be eliminated. This is the point of the present invention.

Figure 7:
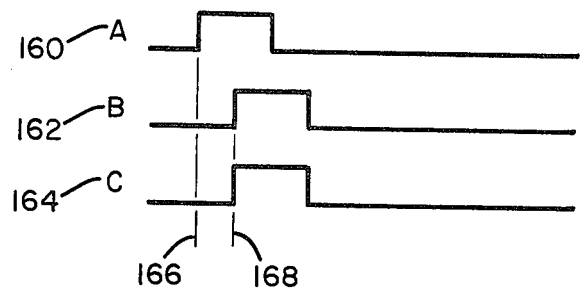
FIG. 7 illustrates the evenly delayed signals utilizing the circuitry of FIG. 7.

Reference to FIG. 7 will illustrate the resulting signals utilizing the properly connected circuitry illustrated in FIG. 6. Signal 160 represents the digital signal as it is made available on printed circuit assembly 20. With the selector lines 140, 142, and 144 in FIG. 6 all grounded on printed circuit assembly 18, the signal represented as 164 results on printed circuit assembly 18. Signal 164 from FIG. 7 is similar to signal 94 in FIG. 5 except that signal 164 is delayed from signal 160 by the amount represented by the difference between time 166 and 168. This amount of time delay will be greater than the time delay evidenced in FIG. 5 between time 96 and time 100, since the signal travels the same physical path and in addition traverses through the logic of the present invention illustrated in FIG. 6. However, it is to be noted that it is not the absolute amount of delay between time 166 and 168 that is between the originating circuit and the utilizing circuit which is important, it is the amount of variance in the delay between all utilizing circuits which is critical. That is, if all utilizing circuits observe the signal at the same instant in time, it makes no difference to them whether the signal originated at an earlier time. The digital signal is then observed at point 132 on printed circuit assembly 22. The value of the selector lines 134, 136, and 138 on printed circuit assembly 22 is then adjusted by means of the ground jumper straps from points 140, 142, and 144 to point ground to the point representing logical ground 154 on printed circuit assembly 22. Thus, for example, on printed circuit assembly 22, point 140 would be jumpered to point 154, thus grounding selector line 134. This would represent a binary 011 on selector lines 134, 136, and 138 and would select signal 122 through selector 126 to the output 128. This would provide an additional amount of delay to the digital signal on printed circuit assembly 22 and this additionally delayed signal is represented as 162 in FIG. 7. Note that the selection has been made such that signal 162 occurs at time 168 which is the exact time of signal 164. Signal 162 on FIG. 7 may be compared to its corresponding signal 92 in FIG. 5. Note that the delay between time 166 and 168 in FIG. 7 is greater than the delay between time 96 and 98 in FIG. 5. Again, however, it is not the absolute amount of delay between the transmitting or originating circuit and the receiving or utilizing circuits that is of utmost importance, it is the difference in the amount of delay as seen by the utilizing circuits. Thus it will be seen that the received signals 162 and 164 on printed circuit assemblies 22 and 18, respectively, occur at the same time, namely, time 168. Thus, the digital signal has been evenly delayed between widely physically located printed circuit assemblies 22 and 18.

Figure 8:
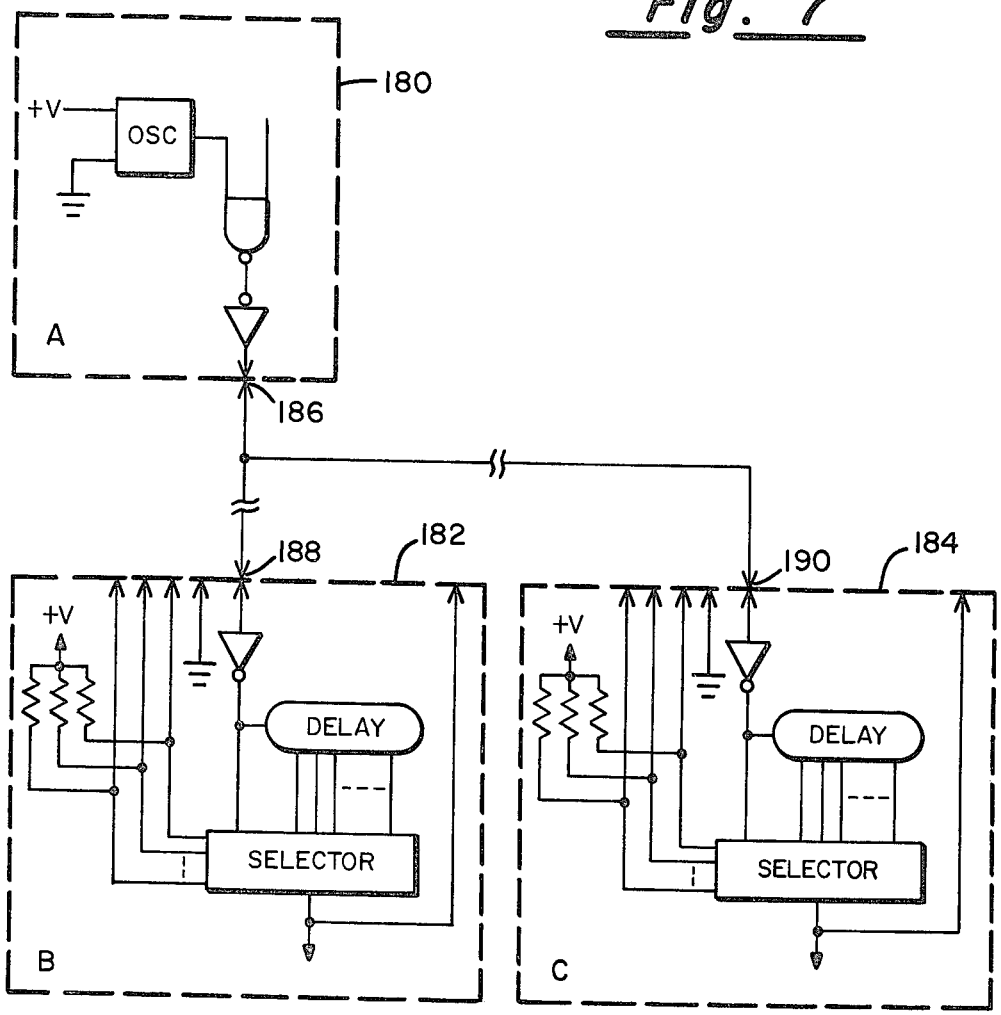
FIG. 8 illustrates the circuitry of the present invention in its inter-connected format in three modular physical locations.

Reference to FIG. 8 shows the functional interconnection of the circuitry illustrated in FIG. 3 to the circuitry illustrated in FIG. 6 among different printed circuit assemblies. In FIG. 8 box 180 represents the circuitry located on the printed circuit 20 of FIG. 2 while box 182 represents the circuitry located on printed circuit assembly 22 in FIG. 2 and box 184 represents the circuitry located on printed circuit assembly 18 in FIG. 2. It is to be noted that the circuitry contained within box 180 is the exact circuitry described in FIG. 3. The circuitry located within boxes 182 and 184 is that exact circuitry which has been described in detail in FIG. 6. The interconnection between these printed circuit assemblies involves the physical interconnection path illustrated in FIG. 2 and involves the logical path illustrated in FIG. 8, that is, the digital signal at its output 186 in box 180, which in FIG. 3 is illustrated by numeral 76, is connected directly at point 188 in box 182 and at point 190 in box 184. Point 188 in box 182 and point 190 in box 184 are represented by numeral 110 in FIG. 6.

Thus, it can be seen that a digital system may be constructed having evenly delayed digital signals by following the following steps: First, connect all printed circuit assemblies and operate the digital system, and measure the time delays between the originating printed circuit assembly and all receiving printed circuit assemblies. Then, take the printed circuit assembly with the largest amount of time delay and ground all select lines at that printed circuit assembly. Then, further individually adjust select lines at all other printed circuit assembly locations for an equal amount of delay among all received digital signals.

Thus, it can be seen that there has been shown and described a novel apparatus for distributing evenly delayed digital signals. It is to be understood, however, that various changes, modifications, substitutions in the form of details of the described apparatus and method can be made by those skilled in the art without departing from the scope of the invention as defined by the following claims.

What is claimed is:

1. In a digital computer system comprising a plurality of discrete modular assemblies that are located at various electrical distances from each other, a system for ensuring that a digital signal originating in one of said modular assemblies is delayed an equal amount at all modular assemblies receiving such digital signal comprising:

each of said receiving modular assemblies including substantially similar digital signal delay means for receiving a digital signal from an originating other one of said modular assemblies and generating a delayed digital signal, said digital signal delay means comprising:

delay line means for receiving a digital signal and generating in response thereto a plurality of delayed digital signals, each one of said delayed digital signals delayed incrementally increasing delay times and coupled to a corresponding separate one of a like plurality of delay line output lines;

a plurality of select lines; and selector means responsively coupled to said select lines and to said delay line output lines for coupling to a single selector means output line a selected one of said delayed digital signals;

means for coupling said digital signal from the originating one of said modular assemblies to the delay line means of the receiving ones of said modular assemblies; and, means coupling digital selection signals to each of the select lines of the receiving ones of said modular assemblies for selecting evenly delayed digital signals at all of said receiving modular assemblies, which evenly delayed digital signals are delayed an equal amount with respect to the digital signal originating at the originating modular assembly.

2. In a digital computer system comprising a plurality of discrete modular assemblies that are located at various electrical distances from each other, a system for ensuring that a digital signal originating in one of said modular assemblies is delayed an equal amount at all modular assemblies receiving such digital signal comprising:

each of said receiving modular assemblies including substantially similar digital signal delay means for receiving a digital signal from an originating other one of said modular assemblies and generating a delayed digital signal, said digital signal delay means comprising:
  delay line means for receiving a digital signal and generating in response thereto 1 through N delayed digital signals, each one of said N delayed digital signals delayed N incrementally increasing delay times and coupled to a corresponding separate one of N delay line output lines;
  M select lines; and
  1 out of N+1 selector means responsively coupled to said M select lines, to said N delay line output lines and to said digital signals for coupling to a single selector means output line a selected one of said N delayed digital signals or said digital signal;
  means for coupling said digital signal from the originating one of said modular assemblies to the delay line means of the receiving ones of said modular assemblies; and,
  means coupling digital selection signals to each of the M select lines of the receiving ones of said modular assemblies for selecting evenly delayed digital signals at all of said receiving modular assemblies, which evenly delayed digital signals are delayed an equal amount with respect to the digital signal originating at the originating modular assembly.

3. Digital signal selector means, comprising:
  digital signal generator means;
  delay line means coupled to said digital signal generator means for receiving said digital signal and generating in response thereto a plurality of delayed digital signals, each one of said delayed digital signals delayed incrementally increasing delay times and coupled to a corresponding separate one of a like plurality of delay line output lines;
  a plurality of select lines;
  selector means responsively coupled to said select lines and to said delay line output lines for coupling to a single selector means output line a selected one of said delayed digital signals; and,
  means coupling digital selection signals to each of said select lines for selecting one of said delayed digital signals.

4. Digital signal selector means, comprising:
  digital signal generator means;
  delay line means coupled to said digital signal generator means for receiving said digital signal and generating in response thereto 1 through N delayed digital signals, each one of said N delayed digital signals delayed N incrementally increasing delay times and coupled to a corresponding separate one of N delay line output lines;
  M select lines; and
  1 out of N+1 selector means responsively coupled to said M select lines, to said N delay line output lines and to said digital signal generator means for coupling to a single selector means output line a selected one of said N delayed digital signals or said digital signal;
  means coupling digital selection signals to each of said M select lines for selecting one of said N delayed digital signals or said digital signal.

* * * * *